United States Patent
Cheung

(10) Patent No.: US 10,095,965 B2
(45) Date of Patent: *Oct. 9, 2018

(54) SYSTEMS AND METHODS FOR PERSONALIZING QR CODES

(71) Applicant: Facebook, Inc., Menlo Park, CA (US)

(72) Inventor: Vincent Charles Cheung, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,865

(22) Filed: Aug. 4, 2017

(65) Prior Publication Data

US 2017/0330063 A1    Nov. 16, 2017

Related U.S. Application Data

(63) Continuation of application No. 15/169,483, filed on May 31, 2016, now Pat. No. 9,811,773, which is a continuation of application No. 14/687,350, filed on Apr. 15, 2015, now Pat. No. 9,390,358.

(51) Int. Cl.
*G06K 19/06*    (2006.01)
*G06K 7/14*    (2006.01)

(52) U.S. Cl.
CPC ..... *G06K 19/06037* (2013.01); *G06K 7/1417* (2013.01); *G06K 19/06103* (2013.01)

(58) Field of Classification Search
CPC ....... G06K 19/06037; G06K 19/06103; G06K 19/06056; G06K 19/0614; G06K 7/1408; G06K 7/1417; G06K 7/1443; G06K 9/4652; G01C 21/206; G06F 21/14; G06F 21/52; G06F 9/4423; G06T 11/00; G06T 2201/0061
USPC ......................................................... 235/494
See application file for complete search history.

(56) References Cited

U.S. PATENT DOCUMENTS

| | | | |
|---|---|---|---|
| 5,714,985 A | 2/1998 | Kawamura | |
| 8,606,657 B2 * | 12/2013 | Chesnut | G06Q 30/00 705/26.61 |
| 9,390,358 B1 * | 7/2016 | Cheung | G06K 19/06103 |
| 2003/0141375 A1 | 7/2003 | Lawandy | |
| 2005/0199721 A1 | 9/2005 | Chang | |
| 2005/0212799 A1 | 9/2005 | Liao | |
| 2006/0097062 A1 | 5/2006 | Cheong | |
| 2010/0259549 A1 * | 10/2010 | Brown | G06F 21/36 345/589 |
| 2011/0026081 A1 | 2/2011 | Hamada | |
| 2011/0117259 A1 * | 5/2011 | Storek | A47J 36/14 426/509 |
| 2011/0266350 A1 | 11/2011 | Chapman | |
| 2013/0021364 A1 | 1/2013 | Azuma | |
| 2014/0035720 A1 | 2/2014 | Chapman | |
| 2014/0103123 A1 | 4/2014 | McKinney, Jr. | |

(Continued)

*Primary Examiner* — Thien M Le
(74) *Attorney, Agent, or Firm* — Sheppard Mullin Richter & Hampton LLP

(57) ABSTRACT

Systems, methods, and non-transitory computer readable media configured to select a code. An image on which the code is superimposed is selected. A block of the code is associated with a corresponding part of the image. A desired value of opacity of the block of the code is determined based on the corresponding part of the image. A personalized code is generated based on the desired value of opacity of the block of the code.

20 Claims, 11 Drawing Sheets

(56) References Cited

U.S. PATENT DOCUMENTS

2014/0156561 A1* 6/2014 Steele ................... B65D 1/36
                                                    705/500
2014/0263674 A1   9/2014 Cerveny
2015/0317923 A1  11/2015 Edmonds
2015/0324946 A1  11/2015 Arce
2016/0334402 A1* 11/2016 Bosio ................ G01N 33/5432

* cited by examiner

SYSTEMS AND METHODS FOR PERSONALIZING QR CODES

CROSS-REFERENCE TO RELATED APPLICATIONS

This application is a continuation of co-pending U.S. patent application Ser. No. 15/169,483, filed on May 31, 2016 and entitled "SYSTEMS AND METHODS FOR PERSONALIZING QR CODES," which is a continuation of U.S. patent application Ser. No. 14/687,350 (now U.S. Pat. No. 9,390,358), filed on Apr. 15, 2015 and entitled "SYSTEMS AND METHODS FOR PERSONALIZING QR CODES." Both U.S. patent application Ser. No. 15/169,483 and U.S. patent application Ser. No. 14/687,350 are incorporated herein by reference in their entireties.

FIELD OF THE INVENTION

The present technology relates to the field of content provision. More particularly, the present technology relates to techniques for generating codes.

BACKGROUND

Today, people often utilize computing devices (or systems) for a wide variety of purposes. Users can use their computing devices, for example, to interact with one another, create content, and access content. In some cases, a user can utilize his or her computing device to scan a machine-readable code, such as a Quick Response (QR) code. The machine-readable code can provide the user with access to content, such as a link or other information.

Conventional approaches to utilizing machine-readable codes generally involve presenting a machine-readable code in one instance and then reading (scanning) the machine-readable code in a separate instance. However, this manner of utilizing machine-readable codes in accordance with conventional approaches can be suboptimal. For example, machine-readable codes are not fully comprehensible to persons and convey little, if anything, about the information that they encode. As another example, the appearance of machine-readable codes can appear as random patterns. As a result, the presentation of machine-readable codes can be dull from the perspective of their intended audiences.

SUMMARY

Various embodiments of the present disclosure can include systems, methods, and non-transitory computer readable media configured to select a code. An image on which the code is superimposed is selected. A block of the code is associated with a corresponding part of the image. A desired value of opacity of the block of the code is determined based on the corresponding part of the image. A personalized code is generated based on the desired value of opacity of the block of the code.

In an embodiment, the code is a QR code.

In an embodiment, the determining a desired value of opacity of the block of the code is based on a value of luminance of pixels of the corresponding part of the image.

In an embodiment, the determining a desired value of opacity of the block of the code is based on a variance of values of luminance of pixels of the corresponding part of the image.

In an embodiment, the determining a desired value of opacity of the block of the code is based on a difference between average luminance of pixels in the corresponding part of the image and average luminance of pixels in a second part of the image adjacent to the corresponding part of the image.

In an embodiment, the desired value of opacity of the block of the code is increased based on at least one of the block of the code being a more important part of the code and the corresponding part of the image being a less important part of the image.

In an embodiment, the desired value of opacity of the block of the code is decreased based on at least one of the block of the code being associated with a less important part of the code and the corresponding part of the image being a more important part of the image.

In an embodiment, desired values of opacity of a plurality of blocks of the code are determined based on corresponding parts of the image.

In an embodiment, the desired values of opacity of the plurality of blocks of the code are adjusted so that the code can be read and the image can be viewed.

In an embodiment, the personalized code is qualified based on a readability threshold.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
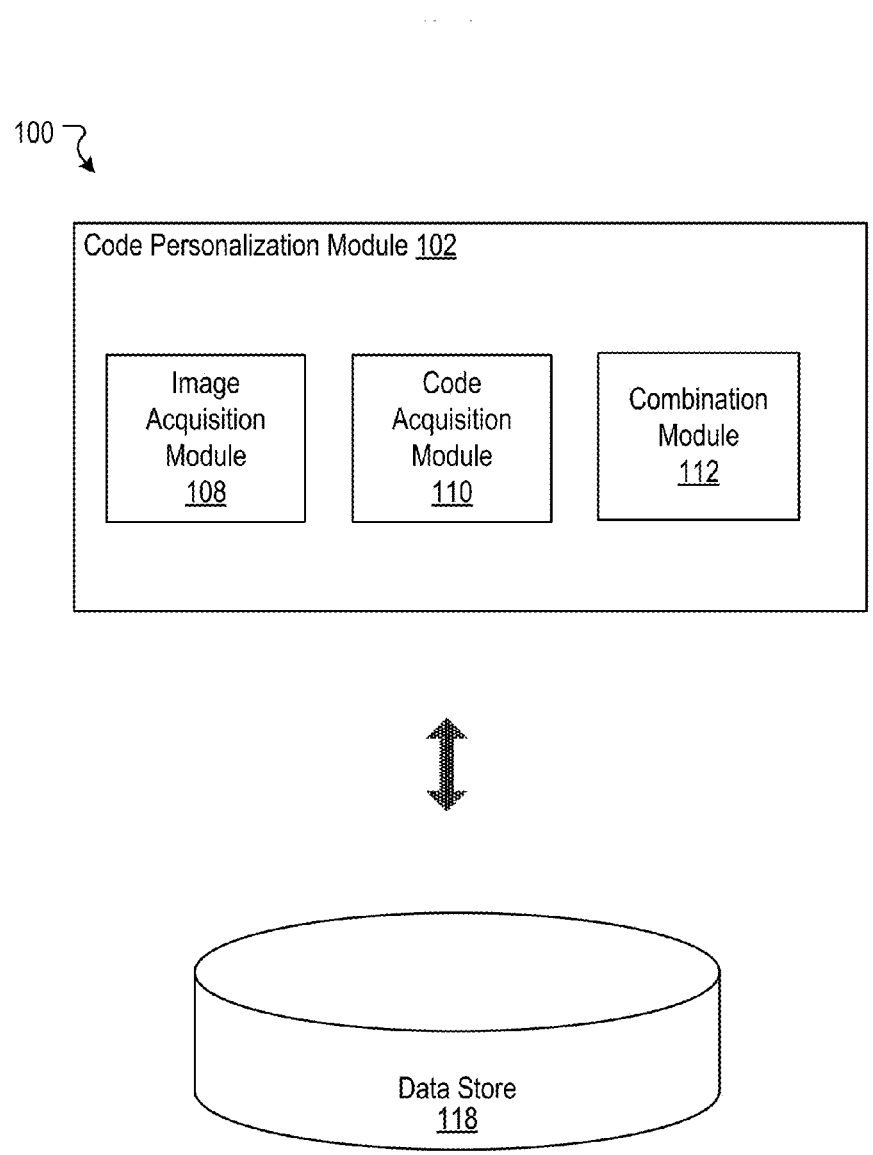
FIG. 1 illustrates a system including an example code personalization module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Personalizing QR Codes

People use computing devices (or systems) for various purposes. Computing devices can provide different kinds of functionality. Users can utilize their computing devices to produce information, access information, and share information. In some cases, users can use their computing devices to produce information which can be represented by machine-readable codes, such as Quick Response (QR) codes. In some instances, users can use their computing devices to read (scan) machine-readable codes in order to access information. Furthermore, in some cases, users can share information using machine-readable codes, which can be provided by computing devices.

Under conventional approaches, QR codes can be used to encode various types of information. For example, QR codes have been used for part tracking in industrial applications and for navigation based on links to sites where information can be presented. The use of QR codes, while effective, can be subject to many disadvantages. For example, QR codes are not readable by persons. Persons who view the QR code can surmise little to nothing about the information encoded by the QR code. Therefore, the QR codes can fail to convey helpful data to persons that relates to their encoded information. As another example, QR codes are patterned as seemingly random patches of black and white. They do not pique the interests of persons who view them.

An improved approach to the presentation of machine-readable codes, such as QR codes, overcomes the foregoing and other disadvantages associated with conventional approaches. In general, systems and methods of the present disclosure can superimpose (overlay) a QR code onto an image to generate a personalized QR code. The personalized QR code can reflect both functional utility and aesthetic flair. The personalized QR code can be generated based on adjustments to the opacity of portions of the QR code in consideration of a variety of factors. Such factors can include, for example, luminance of groups of pixels in the image, variance of luminance of groups of pixels in the image, and differences in luminance between groups of pixels in the image. Further, the opacity of portions of the QR code can be adjusted based on the importance of the portions of the QR code and the importance of corresponding parts of the image. The personalized QR code can be produced in such a manner that the code reflected in the personalized code still can be successfully scanned by a code reader while the image reflected in the personalized code still can be clearly viewed by persons who view the personalized code.

FIG. 1 illustrates an example system 100 including an example code personalization module 102 to generate a machine-readable code that can be personalized in its visual appearance, according to an embodiment of the present disclosure. A machine-readable code (or code) can include, for example, a Quick Response (QR) code, a machine-readable barcode, a machine-readable tag, or other type of machine-readable code. The appearance of the code can be personalized based on an image selected by a user. The image selected to personalize the code can depict any type of content.

The code and the image can be combined to generate a personalized code. In particular, the code can be superimposed (i.e., overlaid) on the image to produce the personalized code. The appearance of the personalized code can be based on adjustments to the opacity of portions of the code in consideration of a variety of factors. Such factors can include, for example, luminance of groups of pixels in the image, variance of luminance of groups of pixels in the image, and differences in luminance between groups of pixels in the image. Further, the opacity of portions of the code can be adjusted based on the importance of the portions of the code and the importance of corresponding parts of the image. The personalized code can be generated to optimize both readability of the code and visibility of the image.

The code personalization module 102 can include an image acquisition module 108, a code acquisition module 110, and a combination module 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the code personalization module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the code personalization module 102 can be implemented, in part or in whole, as software running on one or more computing devices or systems, such as on a server or client computing device. For example, the code personalization module 102 can be implemented as or within an application (e.g., app), a program, or an applet, etc., running on a user computing device or client computing system. In some instances, the code personalization module 102 can, in part or in whole, be implemented within or configured to operate in conjunction with a social networking system (or service), such as the social networking system 630 of FIG. 6. It should be understood that many variations are possible.

The image acquisition module 108 can acquire an image to personalize the code. The image can be selected by a user. In some embodiments, the user can select an image that is a suitable match with the code or the information associated with the code. For example, if the code reflects an address or identifier of certain information, the user can select an image with a *nexus* to the information. In this way, the image can convey to a person who views the image some level of understanding about the information encoded by the code. As another example, if the code reflects an address or identifier of a page of the user in a social networking system, the user can select an image that is personally favored by the user, an image that functions as a profile image of the user, an image representative of the page of the user, an image that reflects the personal interests of the user, etc. Any other types of images can be used to personalize the code. In some embodiments, entities other than the user, such as a connection of the user or a social networking system, can select the image to personalize the code.

The code acquisition module 110 can request generation of a code. The code acquisition module 110 can be configured to facilitate acquisition of a machine-readable code that represents, links to, or is otherwise associated with information to which access is provided through the code. For example, the user can provide an address or identifier (e.g., a link to a profile page of a member of a social networking system) for the information (e.g., profile data about a member of a social networking system). The code acquisition module 110 can obtain a code that is generated based on the address or the identifier associated with the information. The generation of the code can be performed by another module of the code personalization module 102 or by another system that is not shown. After generation of the code, the code can be presented to the user so that the user can provide the code to be scanned by another user. Upon scanning the machine-readable code, a computing device or system of the other user can provide or transmit the code for processing so that the other user can access the encoded information. In some embodiments, the generated code can be provided to the combination module 112 for personalization.

The combination module 112 can combine the code and a selected image associated with the code to produce a personalized code. The code can be superimposed on the image so that the code still can be successfully scanned and the image still can be visually discerned by persons who view the personalized code. Blocks of the code can be matched with corresponding groups of pixels in the image on which the blocks are superimposed. The opacity of the blocks of the code can be determined and varied to optimize both the readability of the code in the personalized code and the visual distinctiveness of the underlying image. The opacity of the blocks of the code to be superimposed on a corresponding group of pixels can be determined on a block by block basis.

For example, the combination module 112 can superimpose a block of the code based on a gradient so that the opacity of a center portion of the block of the code is higher than the opacity of outer portions of the block of the code. In one instance, a Gaussian blur could be used. As another example, the opacity of a block of the code can be varied according to luminance of a corresponding group of pixels, variance of the luminance of a corresponding group of pixels, and a difference in luminance between adjacent groups of pixels. As yet another example, the opacity of the blocks of the code can be reduced and the relative positions of the code and the image can be varied so that the most visually important portions of the image can be appear more prominently. After its generation, the personalized code can be subjected to a readability evaluation to ensure that the code can be successfully scanned. The combination module 112 is discussed in more detail in connection with FIG. 2.

The data store 118 can be configured to store and maintain various types of data, such as the data relating to the generation of personalized codes. The data can include data relating to, for example, links to content or other information, codes encoding the links and other information, images, the association between codes and images selected for combination with the codes, luminance related parameters associated with images, desired distributions of opacity in relation to the luminance related parameters, etc. The data store 118 can also maintain other information associated with the social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the code personalization module 102 can be configured to communicate and/or operate with the data store 118.

Figure 2:
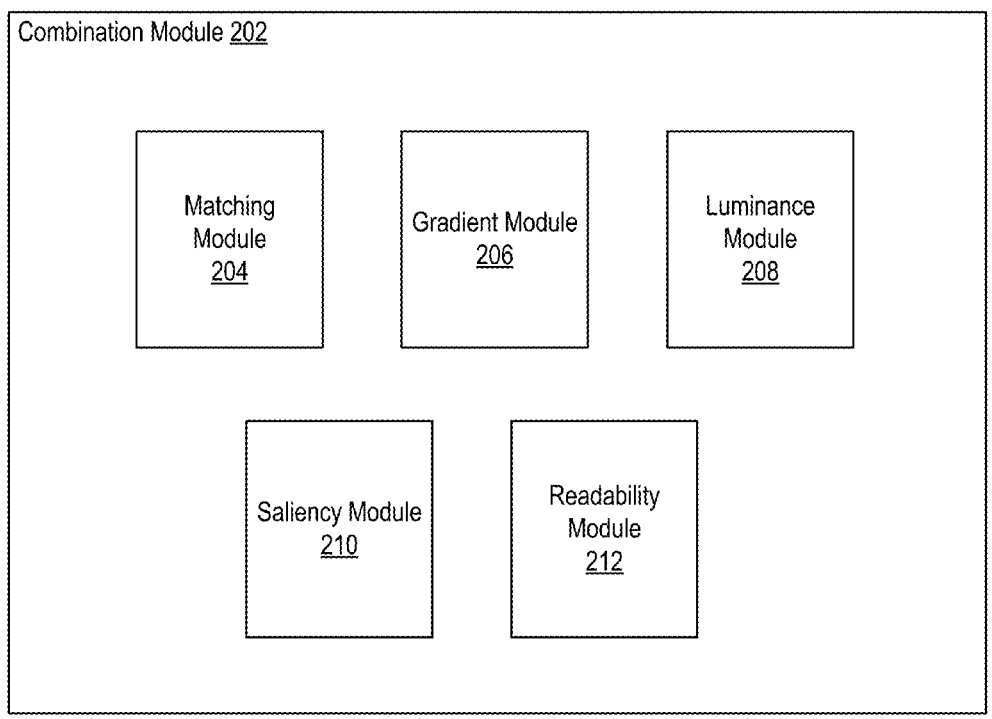
FIG. 2 illustrates an example combination module, according to an embodiment of the present disclosure.

FIG. 2 illustrates an example combination module 202, according to an embodiment of the present disclosure. In some embodiments, the combination module 1112 of FIG. 1 can be implemented with the combination module 202. As shown in the example of FIG. 2, the combination module 202 can include a matching module 204, a gradient module 206, a luminance module 208, a saliency module 210, and a readability module 212. The combination module 202 can selectively modify a code superimposed on an image to generate a personalized code so that the code can be scanned by a code reader and the image is viewable to persons. In various embodiments, one or more of the functionalities described in connection with the combination module 202 can be implemented in any suitable combinations.

Figure 3A:
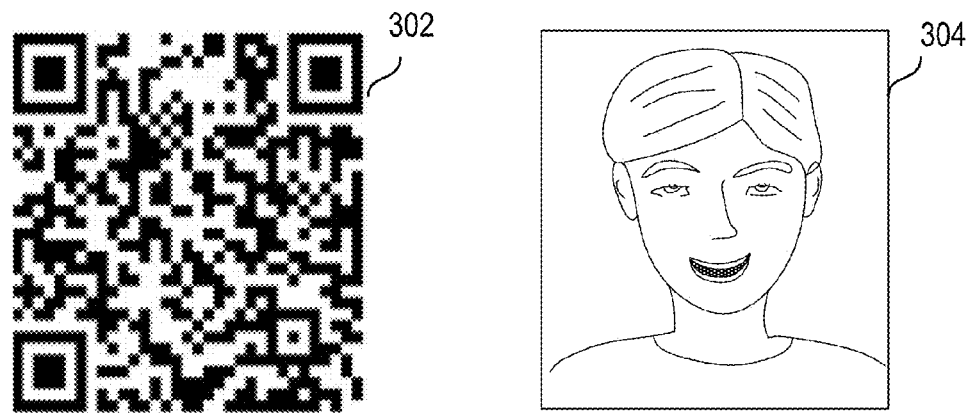
FIGS. 3A and 3B illustrate an example code and an example image, according to an embodiment of the present disclosure.
Figure 3B:
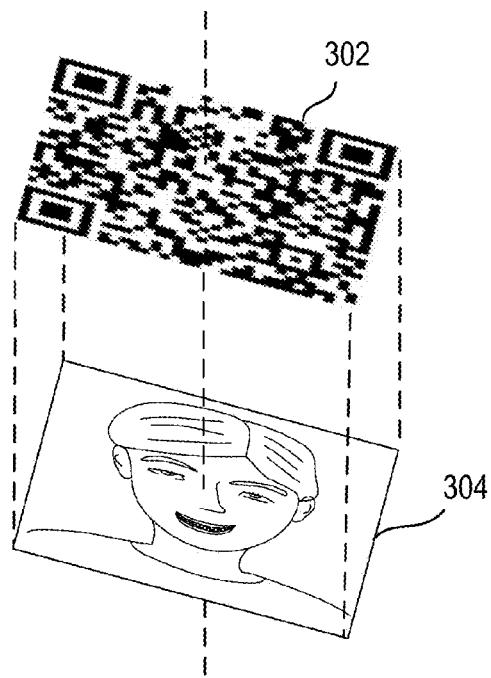

The matching module 204 can obtain a code and an image on which the code is to be superimposed and can align the code over the image. FIG. 3A shows an example code 302 and an example image 304 from which a personalized code is to be generated. The code 302 is to be aligned with and superimposed on the image 304. FIG. 3B shows alignment of the code 302 on the image 304. The matching module 204 can perform the alignment based on one or more of the centers of the image and the code, corners of the image and the code, boundaries of the image and the code, etc.

In connection with FIG. 2, the matching module 204 can match elements of the code with corresponding underlying parts of the image. An element of the code can include any portion (e.g., square, bit, etc.) of the code of any size. For example, an element of the code can be a block of the code. As another example, an element of the code can be a portion of the code that is larger or smaller than a block of the code. Although the example of a block of code is discussed herein in connection with many embodiments of the present disclosure, any element can be used instead. Based on alignment of the code superimposed on the image, a block of code can correspond to a part of the image. A part of the image can include pixels of the image on which a block of code is superimposed. In some embodiments, the matching module 204 can define or apply a common coordinate system or other position determination functionality to match a block of code with a corresponding part of the image. For example, the common coordinate system can identify correspondence between a particular block of code and a corresponding part of the image based on identical positions of the block of code and the part of the image.

The gradient module 206 can alter the appearance of some or all blocks of the code. The appearance of a block of code superimposed on a corresponding part of an image can be adjusted to optimize both the ability to scan the code and the ability to view the image. In particular, the gradient module 206 can adjust the appearance of a block of code based on a gradient of opacity. When the opacity of the block of the code is adjusted by the gradient, a center portion of the block of code can have a relatively high opacity and outer portions of the block of code can have relatively low opacity. The center portion of the block of code can be any shape or form, such as a point, a circle, a square, etc. The gradient of opacity can be linear or nonlinear. When the appearance of the block of code is adjusted by a gradient of opacity, the center portion of the block of code can allow for the ability to successfully scan the code while the outer portion of the block of code can allow for the ability to view a substantial portion of the corresponding part of the image.

In some embodiments, the parts of the code can be altered in shape. For example, alignment markers of the code can be shaped as rectangles or rounded rectangles. As another example, alignment markers of the code can be shaped as circles instead of rectangles or rounded rectangles. The opacity of alignment markers can be based on a gradient.

Like the gradient module 206, the luminance module 208 can alter the appearance of some or all blocks of the code. The opacity of a block of code superimposed on a corresponding part of an image can be adjusted to optimize both the ability to scan the code and the ability to view the image. A desired value of the opacity of a block of code can depend on many considerations. Such considerations can include, for example, a value of luminance of pixels in a corresponding part of the image, a value of variance in luminance of pixels in a corresponding part of the image, and a difference in values of luminance of pixels in adjacent parts of the image.

A desired value of the opacity of a block of code can depend on a value of luminance of pixels in a corresponding part of the image. The value of the luminance of the pixels can be represented over a luminance region (or spectrum). In some embodiments, the luminance region can be defined at one end by a value of black to represent a lowest value of luminance and at an opposite end by a value of white to represent a highest value of luminance. The lowest value of luminance and the highest value of luminance can be numerically represented. For example, the lowest value of luminance can be assigned a value of zero and the highest value of luminance can be assigned a value of one.

The desired value of the opacity of a block of code, which can be represented by a variable alpha, can be a function of a value of luminance. The desired value of the opacity of a block of code can be represented over a region (or spectrum). In some embodiments, the region can be defined at one end by a lowest value of zero and at an opposite end by a highest value of one. When alpha is equal to a highest value of opacity (e.g., one), the block of code is fully opaque and the pixels in the corresponding part of the image cannot be seen. When alpha is equal to a lowest value of opacity (e.g., zero), the block of code is fully not opaque (or transparent) and the block of code cannot be seen while the pixels in the corresponding part of the image can be seen.

Figure 4A:
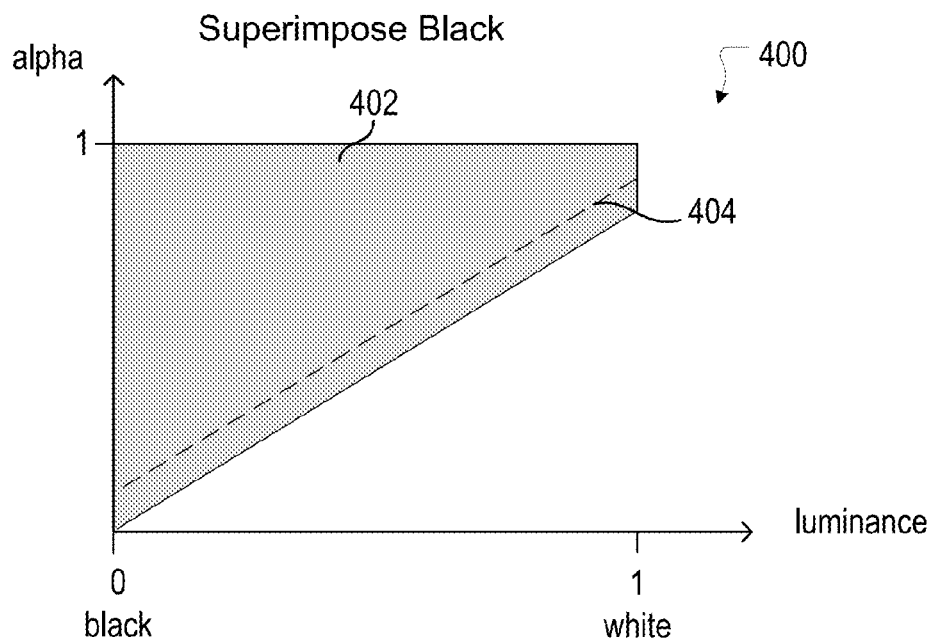
FIGS. 4A and 4B illustrate example graphs, according to an embodiment of the present disclosure.

FIG. 4A illustrates an example graph 400 that shows a desired value of opacity, alpha, as a function of luminance when a block of code to superimpose over pixels of a corresponding part of an image is black. When the block of code is black and underlying pixels of the corresponding part of the image have a relatively low value of luminance, the desired value of opacity can be a value within a relatively large range of possible opacity values. When the block of code is black and underlying pixels of the corresponding part of the image have a relatively high value of luminance, the desired value of opacity can be a value that is above a threshold level and within a relatively small range of possible opacity values. A region 402 in the graph 400 represents a success region of alpha values that can be chosen for values of luminance so that both the code can be scanned by a code reader and the image can be viewed by persons. A line 404 represents potentially optimal values of alpha. The optimal values of alpha are larger than minimum values of alpha in the region 404 by a safety threshold. The optimal values of alpha allow the block of code to be as transparent as possible so that the image can be viewed while at the same time a measure of safety is provided so that the code still can be successfully scanned.

Figure 4B:
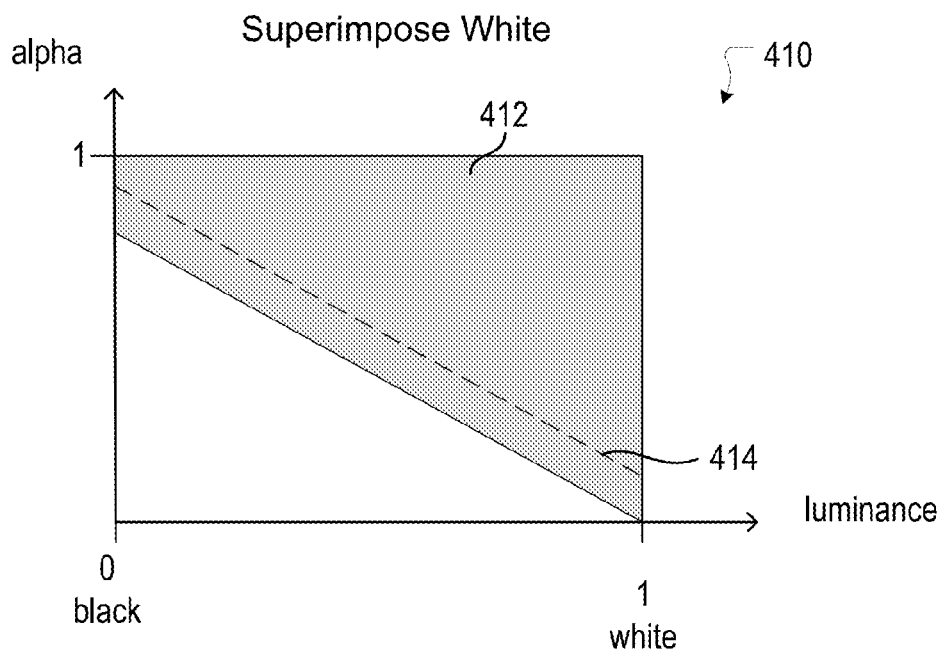

FIG. 4B illustrates an example graph 410 that shows a desired value of opacity, alpha, as a function of luminance when a block of code to superimpose over pixels of a corresponding part of an image is white. When the block of code is white and underlying pixels of the corresponding part of the image have a relatively low value of luminance, the desired value of opacity can be a value that is above a threshold level and within a relatively small range of possible opacity values. When the block of code is white and underlying pixels of the corresponding part of the image have a relatively high value of luminance, the desired value of opacity can be a value within a relatively large range of possible opacity values. A region 412 in the graph 410 represents a success region of alpha values that can be chosen for values of luminance so that both the code can be scanned by a code reader and the image can be viewed by persons. A line 414 represents potentially optimal values of alpha. The optimal values of alpha are larger than minimum values of alpha in the region 412 by a safety threshold. The optimal values of alpha allow the block of code to be as transparent as possible so that the image can be viewed while at the same time a measure of safety is provided so that the code still can be successfully scanned. Although the graph 400 and the graph 410 are shown as having an example slope value, the relationship between alpha and luminance can reflect other slope values in various embodiments. Further, although the graph 400 and the graph 410 are shown as linear, the relationship between alpha and luminance can be nonlinear in other embodiments.

A desired value of the opacity of a block of code also can depend on a value of variance (e.g., standard deviation) of luminance of pixels in a corresponding part of the image. A value of opacity of a block of code based on an average value of luminance of the pixels in a corresponding part of the image when there is variance of luminance of the pixels may not be optimal to allow for both scanning of the code and viewing of the image. When the luminance of pixels in a corresponding part of the image varies, a higher value of opacity of a block of code can be desired. For example, as the variance of the luminance of pixels in a corresponding part of the image increases, the desired value of opacity of a block of code can increase. In some embodiments, a desired value of opacity for a block of code can be a function of the variance of luminance of pixels in a corresponding part of the image. In some instances, the function can be linear or nonlinear.

A desired value of the opacity of a block of code also can depend on the difference between average luminance of pixels in adjacent parts of the image. When the average luminance of pixels in a first part of the image is a relatively high value and the average luminance of pixels in a second part of the image adjacent to the first part of the image is a relatively low value, higher values of opacity for associated blocks of code can be desired. For example, as the difference between the average luminance of pixels in a first part of the image and the average luminance of pixels in an adjacent second part of the image increases, the desired values of opacity of the two associated blocks of code can increase. In some embodiments, a desired value of opacity for a block of code can be a function of the difference in average luminance in corresponding part of the image and an adjacent part of the image. In some instances, the function can be linear or nonlinear.

Figure 4C:
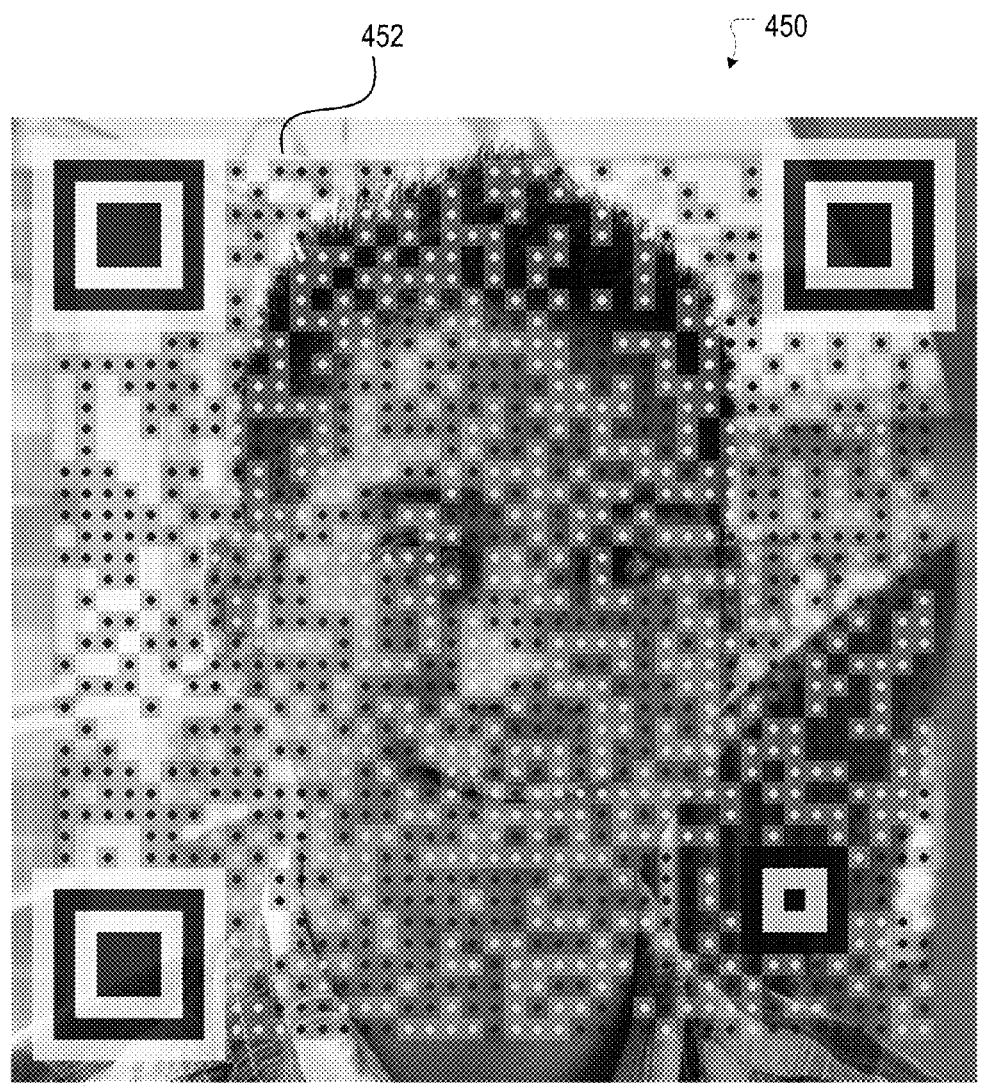
FIGS. 4C-4E illustrate example personalized codes, according to an embodiment of the present disclosure.
Figure 4D:
Figure 4E:
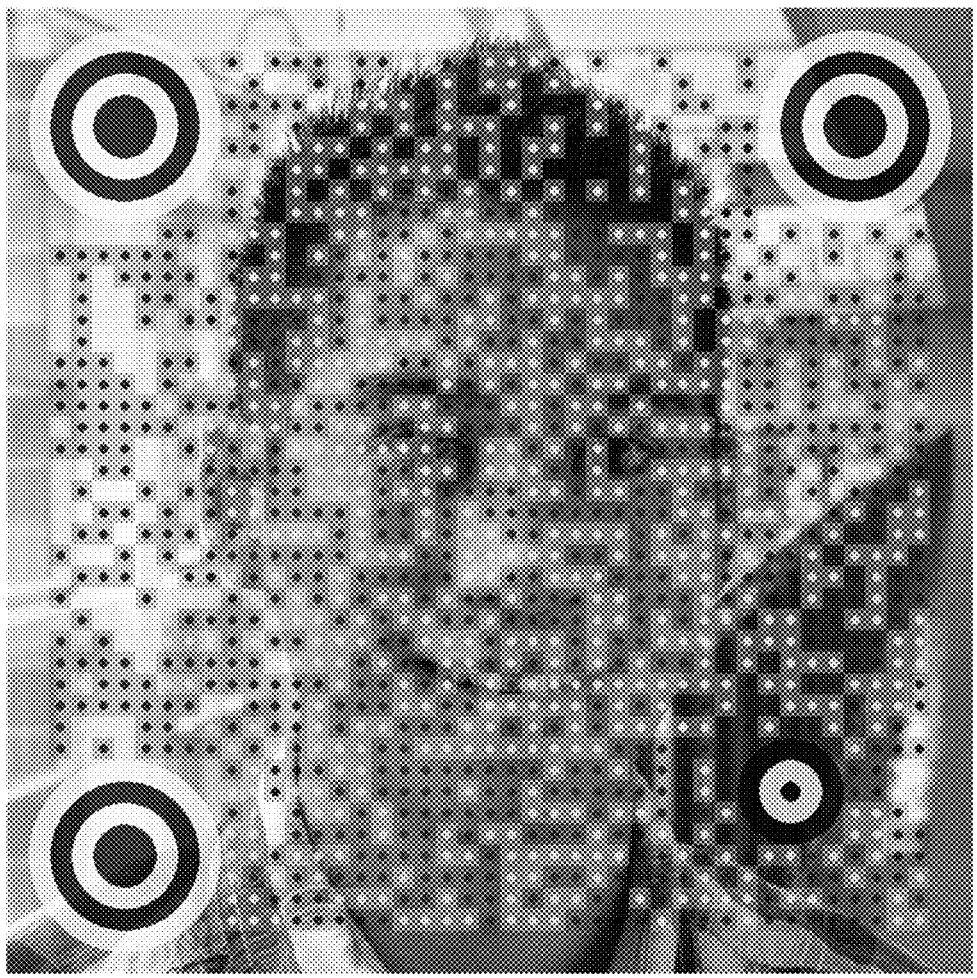

In some embodiments, each block of code can have more than one tone. For example, each block of code can have two tones in a two-toned version of a personalized code. In a two-toned version of a personalized code, a foreground tone located in the center of the block of code can be associated with a foreground alpha value and a background tone located outside of the center of the block of code can be associated with a background alpha value. FIGS. 4C-4E show examples of two-toned versions of personalized codes and, in particular, personalized code 450 in FIG. 4C, personalized code 460 in FIG. 4D, and personalized code 470 in FIG. 4E. Each block of code in the personalized codes 450, 460, 470 is two toned. For example, a block of code 452 in the personalized code 450 includes a foreground tone that appears as a disc centered in the block and a background tone that appears between the boundaries of the disc and the block. In various embodiments, the appearance of the foreground tone and the background tone can take any suitable shape or size.

Example alpha values can be used when black is superimposed in connection with a two-toned personalized code. When luminance is equal to zero (black luminance) for superimposition of black, a foreground alpha value can be set such that alpha0=0.4*0.2=0.08. When luminance is equal to one (white luminance) for superimposition of black, a foreground alpha value can be set such that alpha1=0.4. When luminance is equal to zero (black luminance) for superimposition of black, a background alpha value can be set such that alpha0=0.2*0.2=0.04. When luminance is equal to one (white luminance) for superimposition of black, a background alpha value can be set such that alpha1=0.2. In general, a value of alpha can be determined by the equation alpha=luminance*alpha1+(1−luminance)*alpha0, where luminance is the mean luminance of pixels over which black is being superimposed. Other suitable foreground and background values of alph0 and alpha1 and other equations to determine the value of alpha can be used in other embodiments.

Example alpha values can be used when white is superimposed in connection with a two-toned personalized code. When luminance is equal to zero (black luminance) for superimposition of white, a foreground alpha value can be set such that alpha0=0.5. When luminance is equal to one (white luminance) for superimposition of white, a foreground alpha value can be set such that alpha1=0.5*0.2=0.1. When luminance is equal to zero (black luminance) for superimposition of white, a background alpha value can be set such that alpha0=0.32. When luminance is equal to one (white luminance) for superimposition of white, a background alpha value can be set such that alpha1=0.32*0.2=0.064. In general, a value of alpha can be determined by the equation alpha=luminance*alpha1+(1−luminance)*alpha0 where luminance is the mean luminance of pixels over which white is being superimposed. Other suitable foreground and background values of alph0 and alpha1 and other equations to determine the value of alpha can be used in other embodiments.

In some embodiments, alpha values can be further modified by a value of intensity. The intensity is calculated for each pixel region and it is the maximum absolute difference in mean luminance between its pixels and the mean luminance of the adjacent pixel regions. The standard deviation of the luminance of the pixels in a region can be rescaled to be between 0 and 1 if multiplied by 2 since the maximum standard deviation is 0.5. The final intensity value is the maximum of this rescaled standard deviation and the above intensity value. An intensity value of 0 gives the alpha values set forth above and is used over areas of uniformity where it is easier for the code to be read since the image pixels are not interfering with the code. An intensity value of 1 is an area where the underlying pixels and/or adjacent pixels are varied. The intensity values only affect the foreground alpha values. This calculation of the intensity allows alteration of the alpha values of the block of code based on both the variance (standard deviation) of the underlying pixels and the differences in luminance between the adjacent regions.

For example, to superimpose black, foreground alpha values can be set such that alpha0=0.4*0.2+(0.75−0.4*0.2)*intensity and alpha1=0.4+0.6*intensity, while background alpha values can be set such that alpha0=0.2*0.2=0.04 and alpha1=0.2. For example, to superimpose white, foreground alpha values can be set such that alpha0=0.5+0.5*intensity and alpha1=0.5*0.2+(0.75−0.5*0.2)*intensity, while background alpha values can be set such that alpha0=0.32 and alpha1=0.32*0.2=0.064. Again, other suitable foreground and background values of alph0 and alpha1 can be used in other embodiments.

The saliency module 210 can selectively adjust the opacity of a block of code based on importance of parts of the code. The saliency module 210 can identify blocks of code that are relatively more important for proper scanning of the code. Blocks of code that are relatively more important can include portions of the code that relate to, for example, timing, alignment, version information, format information, the quiet zone, etc. For blocks of code that are relatively more important, the saliency module 210 can maintain or increase the opacity of the blocks of code to optimize the ability to scan the blocks. The saliency module 210 also can identify blocks of code that are relatively less important for proper scanning of the code. Blocks of code that are relatively less important can include portions of the code that are associated with, for example, an error correction region of the code. For blocks of code that are relatively less important, the saliency module 210 can maintain or decrease the opacity of the blocks of code to optimize the ability to view the image. In some embodiments, an administrator of a social networking system or a user who selected the image can determine blocks of code that are more important and blocks of code that are less important.

The saliency module 210 can selectively adjust the opacity of a block of code based on importance of part of an image. The saliency module 210 can identify parts of an image that are relatively more important for meaningfully viewing the image. The parts of an image that are relatively more important can include, for example, faces in an image, primary subject matter in the image, other objects in the image, the center of the image, etc. For blocks of code associated with the parts of an image that are relatively more important, the saliency module 210 can decrease the opacity of the blocks of code to optimize the ability of persons to view the parts of the image. Further, when the blocks of code associated with parts of an image that are relatively more important are included in error correction regions of the code, the saliency module 210 can further decrease the opacity of the blocks because, even if some of the blocks are not readable, the code still can be readable. The saliency module 210 can identify parts of an image that are relatively less important for meaningfully viewing the image. The parts of an image that are relatively less important can include, for example, objects positioned along edges of the image. For blocks of code associated with the parts of an image that are relatively less important, the saliency module 210 can increase the opacity of the blocks of code to optimize the readability of the code. In some embodiments, an administrator of a social networking system or a user who selected the image can determine parts of an image that are more important and parts of an image that are less important.

The saliency module 210 also can adjust the relative position of a code and an image on which the code is superimposed. For example, the relative position of the code and the image can be adjusted so that the parts of the image that are relatively more important are positioned under blocks of the code that are relatively less important. As a result, the saliency module 210 can decrease the opacity of the blocks of the code that are relatively less important to optimize the visibility of the parts of the image. As another example, the relative position of the code and the image can be adjusted so that parts of the image that are relatively less important are positioned under blocks of the code that are relatively more important. As a result, the saliency module 210 can increase the opacity of the blocks of code that are relatively more important to optimize the readability of the blocks of code.

The readability module 212 can assess readability of generated personalized codes. The readability module 212 can determine whether adjustments to a code in the generation of a personalized code have impacted the readability of the code. In some embodiments, the readability module 212 can qualify a generated personalized code based on a readability threshold. For example, a readability threshold can be a required percentage of successful attempts to read the personalized code. A readability threshold can require that, for example, a certain number of attempts out of 100 attempts to read the code result in successful reading of the code. The readability threshold can be selected by an administrator of a system that implements the code personalization module 102, such as a social networking system.

If a generated personalized code satisfies the readability threshold, the personalized code can be presented to the user and to other members of the social networking system who may be prompted to read and view the personalized code. If a generated personalized code does not satisfy the readability threshold, the combination module 202 can selectively increase values of opacity of blocks of code to generate a new personalized code. The readability threshold then can be applied to the new personalized code. The process can continue until a generated personalized code satisfies the readability threshold. In some embodiments, the readability module 212 can apply minimum threshold values of opacity to blocks of code to ensure that, no matter the functionality of the combination module 202 utilized to generate the personalized code, the personalized code can be successfully read.

Figure 5A:
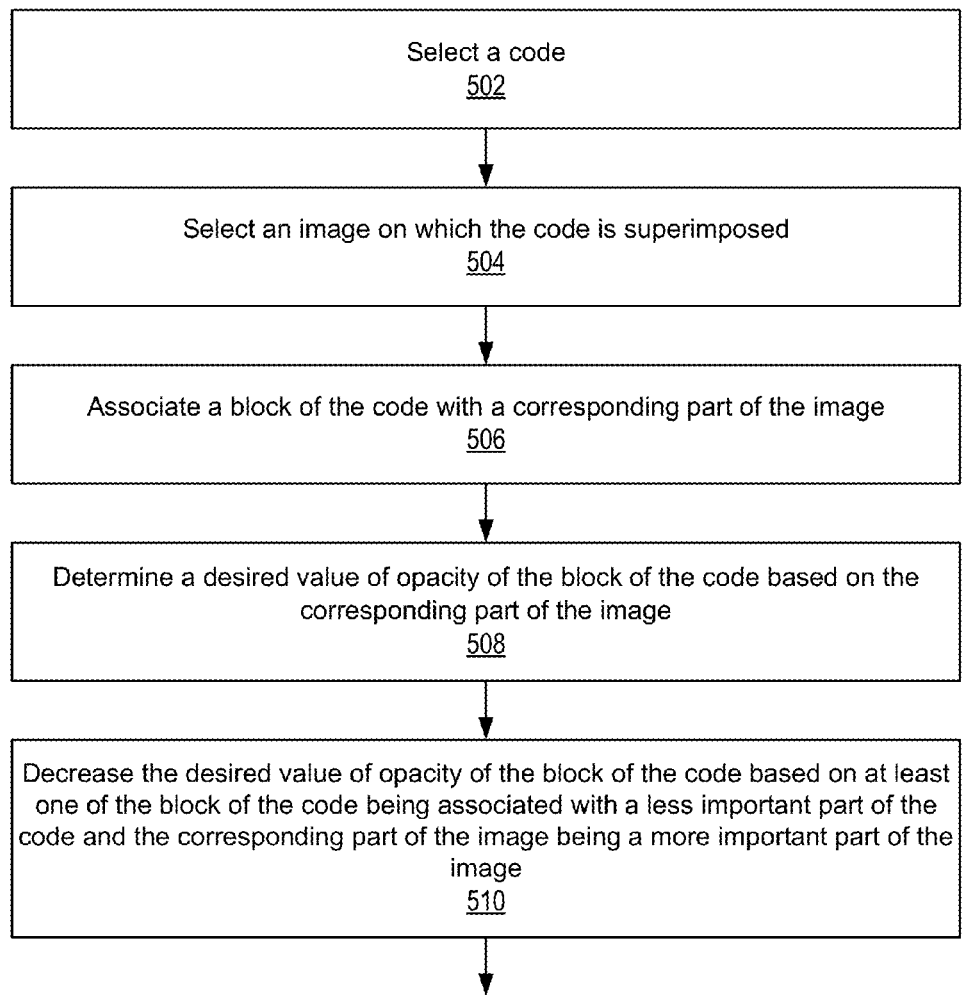
FIGS. 5A-5B illustrate an example method, according to an embodiment of the present disclosure.
Figure 5B:
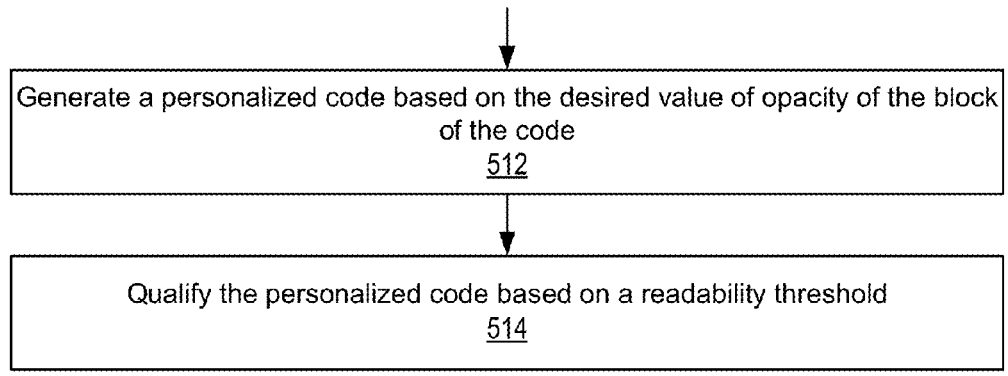

FIGS. 5A-5B illustrate an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can select a code. At block 504, the method 500 can select an image on which the code is superimposed. At block 506, the method 500 can associate a block of the code with a corresponding part of the image. At block 508, the method 500 can determine a desired value of opacity of the block of the code based on the corresponding part of the image. At block 510, the method 500 can decrease the desired value of opacity of the block of the code based on at least one of the block of the code being associated with a less important part of the code and the corresponding part of the image being a more important part of the image. At block 512, the method 500 can generate a personalized code based on the desired value of opacity of the block of the code. At block 514, the method 500 can qualify the personalized code based on a readability threshold. Other suitable techniques are possible.

Social Networking System—Example Implementation

Figure 6:
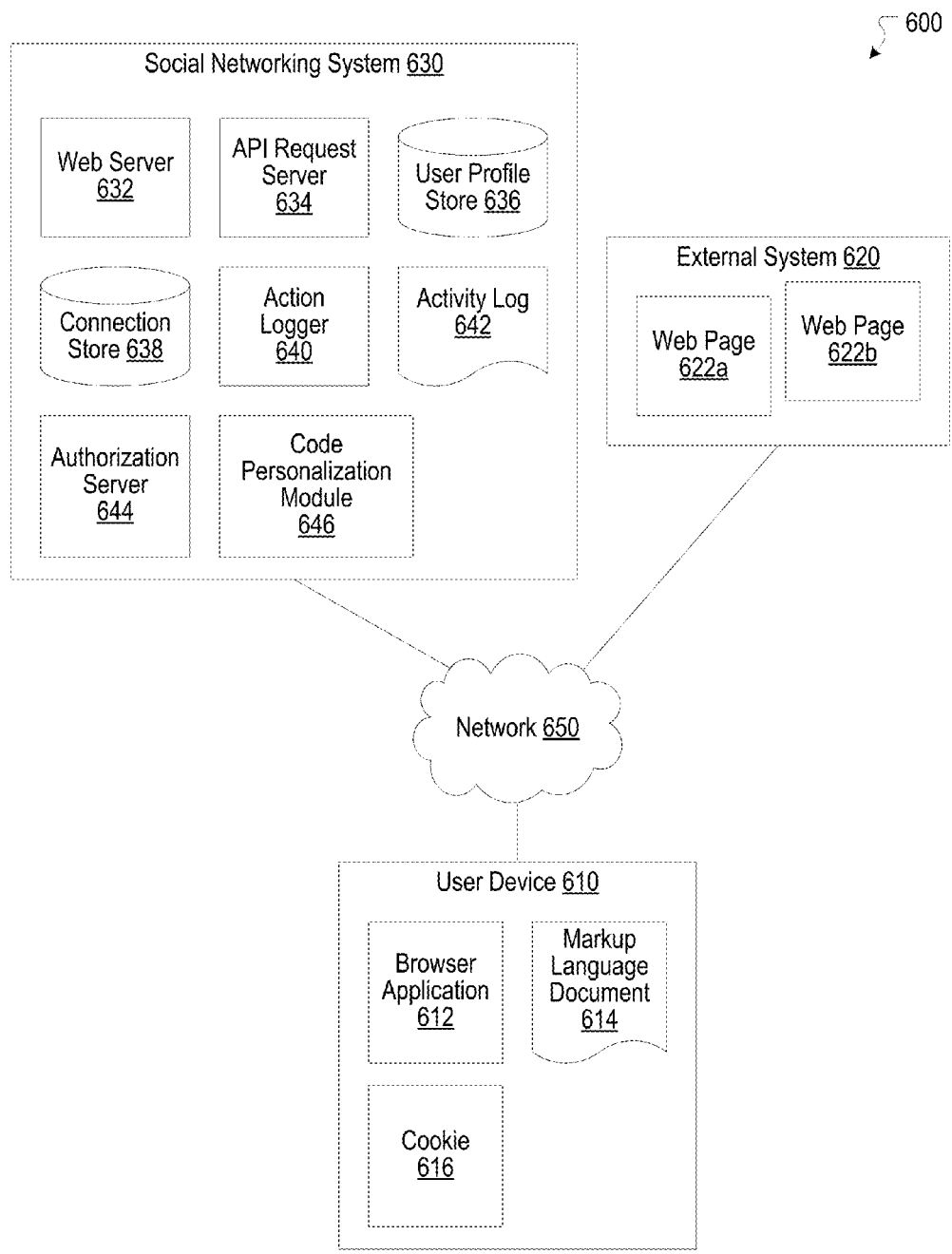
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a code personalization module 646. The code personalization module 646 can be implemented with the code personalization module 102.

Hardware Implementation

Figure 7:
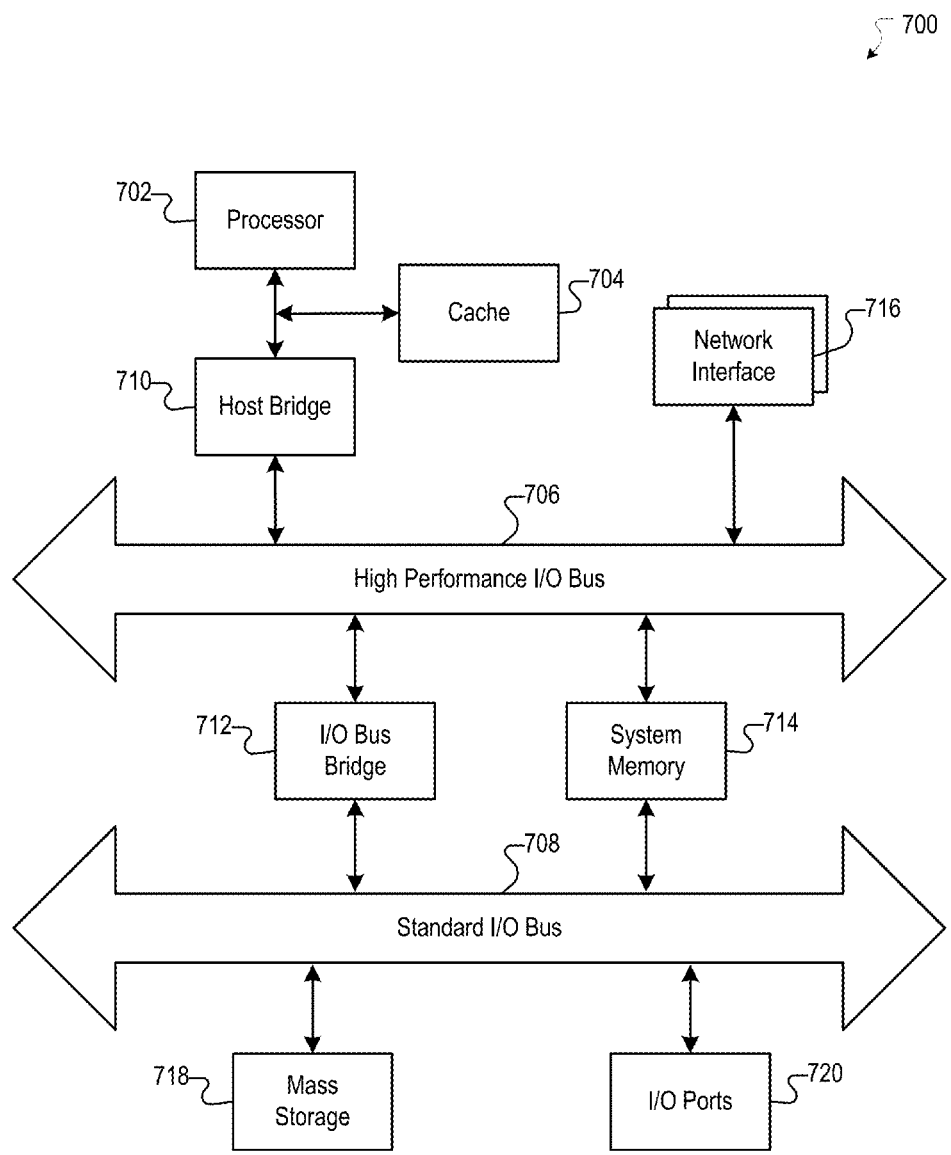
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   associating, by a computing system, one or more blocks of a scannable code with one or more corresponding parts of an image;
   generating, by the computing system, a personalized scannable code from the scannable code based on one or more adjusted opacities for the one or more blocks of the scannable code;
   determining, by the computing system, the personalized scannable code to not satisfy a readability threshold; and
   adjusting, by the computing system, one or more opacities of one or more blocks of the personalized scannable code.

2. The computer-implemented method of claim 1, wherein the scannable code is a QR code.

3. The computer-implemented method of claim 1, wherein the adjusting the one or more opacities of the one or more blocks of the personalized scannable code comprises increasing an opacity of a first block of the blocks of the personalized scannable code when the first block is relatively more important than a second block of the blocks of the personalized scannable code.

4. The computer-implemented method of claim 3, wherein the adjusting the one or more opacities of the one or more blocks of the personalized scannable code further comprises decreasing an opacity of the second block.

5. The computer-implemented method of claim 1, wherein the adjusting the one or more opacities of the one or more blocks of the personalized scannable code comprises decreasing an opacity of a first block of the blocks of the personalized scannable code when a first corresponding part of the one or more corresponding parts of the image is relatively more important than a second corresponding part of the one or more corresponding parts of the image.

6. The computer-implemented method of claim 5, wherein the adjusting the one or more opacities of the one or more blocks of the personalized scannable code further comprises increasing an opacity of a second block of the blocks of the personalized scannable code.

7. The computer-implemented method of claim 1, wherein a first block of the blocks of the personalized scannable code relates to at least one of timing, alignment, version information, format information, or a quiet zone.

8. The computer-implemented method of claim 1, wherein a second block of the blocks of the personalized scannable code relates to an error correction region.

9. The computer-implemented method of claim 1, wherein a first corresponding part of the one or more corresponding parts of the image relates to at least one of a face in the image, primary subject matter of the image, an object in the image, or a center of the image.

10. The computer-implemented method of claim 1, wherein a second corresponding part of the one or more corresponding parts of the image relates to an object positioned along an edge of the image.

11. A system comprising:
    at least one processor; and
    a memory storing instructions that, when executed by the at least one processor, cause the system to perform:
    associating one or more blocks of a scannable code with one or more corresponding parts of an image;
    generating a personalized scannable code from the scannable code based on one or more adjusted opacities for the one or more blocks of the scannable code;
    determining the personalized scannable code to not satisfy a readability threshold; and
    adjusting one or more opacities of one or more blocks of the personalized scannable code.

12. The system of claim 11, wherein the scannable code is a QR code.

13. The system of claim 11, wherein the adjusting the one or more opacities of the one or more blocks of the personalized scannable code comprises increasing an opacity of a first block of the blocks of the personalized scannable code when the first block is relatively more important than a second block of the blocks of the personalized scannable code.

14. The system of claim 13, wherein the adjusting the one or more opacities of the one or more blocks of the personalized scannable code further comprises decreasing an opacity of the second block.

15. The system of claim 11, wherein the adjusting the one or more opacities of the one or more blocks of the personalized scannable code comprises decreasing an opacity of a first block of the blocks of the personalized scannable code when a first corresponding part of the one or more corresponding parts of the image is relatively more important than a second corresponding part of the one or more corresponding parts of the image.

16. A non-transitory computer-readable storage medium including instructions that, when executed by at least one processor of a computing system, cause the computing system to perform a method comprising:
associating one or more blocks of a scannable code with one or more corresponding parts of an image;
generating a personalized scannable code from the scannable code based on one or more adjusted opacities for the one or more blocks of the scannable code;
determining the personalized scannable code to not satisfy a readability threshold; and
adjusting one or more opacities of one or more blocks of the personalized scannable code.

17. The non-transitory computer-readable storage medium of claim 16, wherein the scannable code is a QR code.

18. The non-transitory computer-readable storage medium of claim 16, wherein the adjusting the one or more opacities of the one or more blocks of the personalized scannable code comprises increasing an opacity of a first block of the blocks of the personalized scannable code when the first block is relatively more important than a second block of the blocks of the personalized scannable code.

19. The non-transitory computer-readable storage medium of claim 18, wherein the adjusting the one or more opacities of the one or more blocks of the personalized scannable code further comprises decreasing an opacity of the second block.

20. The non-transitory computer-readable storage medium of claim 16, wherein the adjusting the one or more opacities of the one or more blocks of the personalized scannable code comprises decreasing an opacity of a first block of the blocks of the personalized scannable code when a first corresponding part of the one or more corresponding parts of the image is relatively more important than a second corresponding part of the one or more corresponding parts of the image.

* * * * *